Jan. 6, 1970     C. G. WAYBRIGHT     3,487,567

INFORMATION EMBLEM

Filed Nov. 20, 1967

INVENTOR.
CLARENCE G. WAYBRIGHT
BY
Schapp & Hatch
ATTORNEYS

United States Patent Office 3,487,567
Patented Jan. 6, 1970

3,487,567
INFORMATION EMBLEM
Clarence G. Waybright, Liberal, Kans., assignor to Liberal Auto-Club, Liberal, Kans., a corporation of Kansas
Filed Nov. 20, 1967, Ser. No. 684,371
Int. Cl. G09f 3/02
U.S. Cl. 40—22
7 Claims

ABSTRACT OF THE DISCLOSURE

An information emblem for vehicular windows and the like in which a sheet of thin, transparent plastic material has a transparent adhesive coating on one side and printed indicia on the other side including an opaque coating so that the indicia will be visible through the sheet. Special indicia is provided on embossed, pressure-sensitive tape adhered to the opaque coating and printed indicia. The adhesive is strong enough to strip the opaque coating from the transparent plastic sheet so that tampering is readily discernible therethrough. The device is mounted on a windshield or the like by a transparent adhesive so that tampering with the special indicia tape will be readily apparent from outside the vehicle.

BACKGROUND OF THE INVENTION

The present invention relates to improvements in an Information Emblem, and more particularly to a tamper-proof sticker suitable for carrying identifying indicia.

It is well known to place stickers on windshields or backlites of automobiles in order to present a message such as political preferences, memberships in automobile clubs, or items of that nature. Such stickers are usually in the nature of simple signs which simply convey a message from the owner of the automobile to the public in general, and no special construction is required. It is also well known to supply credit cards, membership cards and other identifying indicia to certain people who can then use such cards for the purpose of obtaining privileges. However, cards used infrequently are often misplaced and certain other disadvantages arise in the use of cards, which makes it more feasible to utilize a windshield sticker or the like for identification purposes.

Another problem which arises in connection with the use of identification, regardless of whether a card is used or different means, is the matter of rendering the identification sufficiently tamper-proof that all temptations are abrogated and considerable effort would be required to effect a fraud or swindle.

SUMMARY OF THE INVENTION

Accordingly, it is a primary object of the present invention to provide a device capable of use on automobile windows and the like which is capable of identifying and establishing a person's right to a privilege, yet which may not be easily altered by a would-be user.

The information emblem constructed in accordance with this invention comprises a main body of transparent plastic material, which carries permanent indicia to be used for all members or people of the class to be identified, and one or more secondary bodies of plastic material having special indicia for specific identification purposes, such as serial number and currently paid up status. The main body preferably includes a sheet of Mylar plastic and has a transparent pressure sensitive adhesive coating on one side thereof and indicia on the other side thereof. The secondary body is adhered to the indicia on the back of the main body, either directly or indirectly, but in such a fashion that removal of the secondary body will remove or obliterate at least a portion of the indicia showing from the face side of the main body. In this way, a person cannot tear off the secondary body, and replace it with another secondary body having different indicia without causing the change to show from the front side of the device.

Preferably, the secondary body of plastic material is a plastic strip also having pressure sensitive adhesive on one side thereof and imprinted special indicia on the other side. In the preferred form, a plastic tape capable of having indicia embossed therein is adhered through pressure sensitive adhesive to the main body of the sticker. Such tape is well known in the marketplace, an example being Dymo tape manufactured by Dymo Industries, Inc., Box 1030, Berkeley 1, Calif.

Since Tapewriters are well known, it would be possible for a user to remove a strip of tape containing, for example, the expiration date; and insert another strip that would contain a different and later expiration date, and insert another strip that would contain a different and later expiration date. Such a change might not materially influence the appearance of the changed side of the sticker, but it would remove a portion of the indicia on the back side of the sticker showing through the front of the windshield. Accordingly, a sticker tampered in this manner would not be honored.

While the main purpose of the invention is served by providing one layer of a main body of transparent material having transparent adhesive on one side and indicia on the other side, it will be appreciated that laminated plastic bodies and a plurality of layers of printing or painting could be utilized, if desired, the important consideration being that the relative strength of adherence of the various multiple layers is such that removal of the second body of plastic would cause removal of indicia showing from the front side.

In fact, in the preferred form of the invention, a plurality of layers of printing are utilized so that double-faced indicia are provided. In other words, the printing that shows through from the adhesive side of the sticker through the window usually carries general information and is contrasted with some kind of opaque layer which may or may not be a backing for the indicia. The other side then contains the special indicia visible from the inside of the car and showing the member's name, serial number, and expiration date, in a typical situation.

In such a case, the layers of paint will adhere to each other with better bonding than they will adhere to the transparent plastic and they will adhere to the second body of plastic material with a stronger bond also than to the main body of plastic. Accordingly, removal of the second body of plastic will necessarily cause removal of the telltale indicia. It will also be appreciated that event with multiple layers of indicia, the layers of painting or printing will be very thin and removal by use of razor blades or other such tooling would also be difficult, if not impossible, to achieve without the tampering being noticeable.

From the foregoing, it is apparent that an object of the invention is to provide an information emblem of the character described which is simple in construction, and which may be inexpensively made for an extremely large number of individuals who would necessarily carry different information.

A further object of the invention is to provide a windshield sticker of the character described which could be easily replaced, should it become advisable to do so.

Yet another object of the invention is to provide a sticker of the character described which is attractive in appearance and which may display indicia in an attractive form capable of carrying an advertising message in addition to the desiderata of this invention.

Further objects and advantages of the invention will be apparent as the specification progresses, and the new and useful features of the sticker for vehicular windows and the like will be more fully defined in the claims attached hereto.

BRIEF DESCRIPTION OF THE DRAWING

A preferred form of the invention is illustrated in the accompanying drawing forming a part of this specification, in which.

While only the preferred form of the invention is shown, it should be understood that various changes or modifications may be made within the scope of the claims attached hereto without departing from the spirit of the invention.

DESCRIPTION OF THE PREFERRED EMBODIMENT

Figure 1:
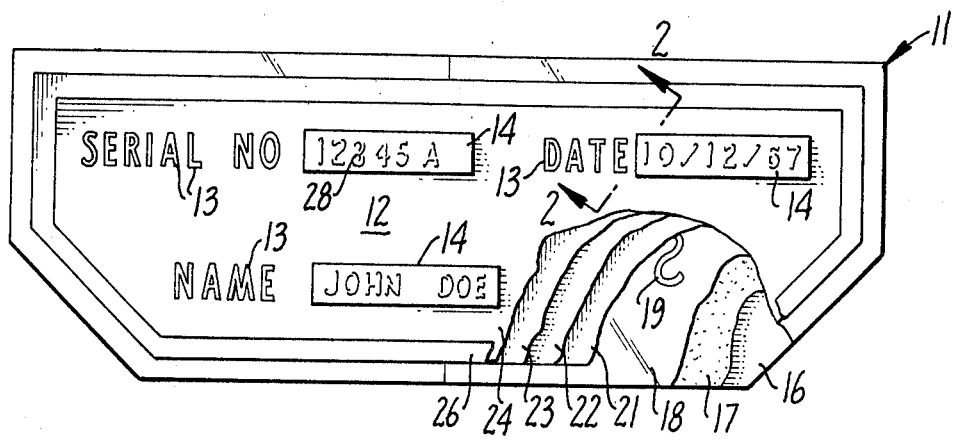
FIGURE 1 is a plan view of a windshield sticker constructed according to the invention as it appears from one side and prior to attachment to a window or the like with portions broken away to illustrate internal structure.

Referring to FIGURE 1 in greater detail, there is shown a windshield sticker 11 as it appears prior to application to a windshield or the like. As here shown, the sticker contains a face side 12 having indicia 13 imprinted thereon. In addition, the sticker will contain strips of a second body of plastic material 14 located in strategic places, said strips being typically those formed from a conventional Tapewriter.

Figure 2:
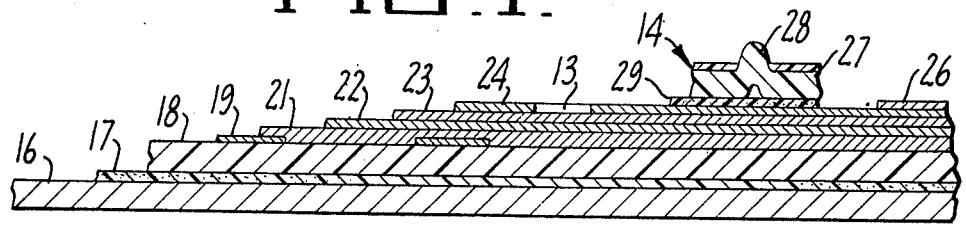
FIGURE 2 is an enlarged, fragmentary, cross-sectional view of the windshield sticker taken substantially on the plane of line 2—2 of FIGURE 1.

Referring more particularly to FIGURE 2, it is seen that the sticker of FIGURE 1 consists of the following layers starting with the paper 16 utilized for protecting the sticker prior to use. Adjacent to the layer 16 is an adhesive layer 17 carried on the main body of plastic 18 which is preferably a transparent Mylar resin. A typical Mylar plastic to be utilized as a main body will be say 0.002 to 0.003 inch in thickness, but will have excellent strength characteristics as is typical of thin polyester sheets.

Figure 3:
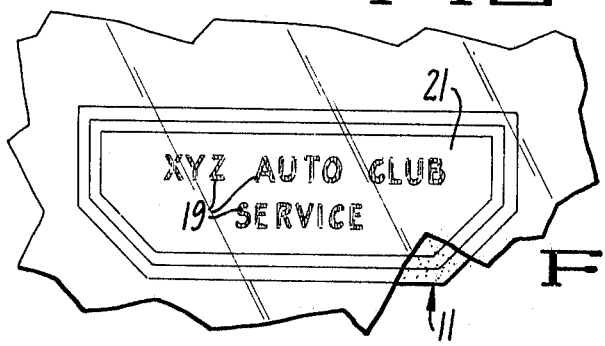
FIGURE 3 is a front view of the windshield sticker of FIGURE 1 mounted in place on a window, as it appears from the other side of the window.
Figure 4:
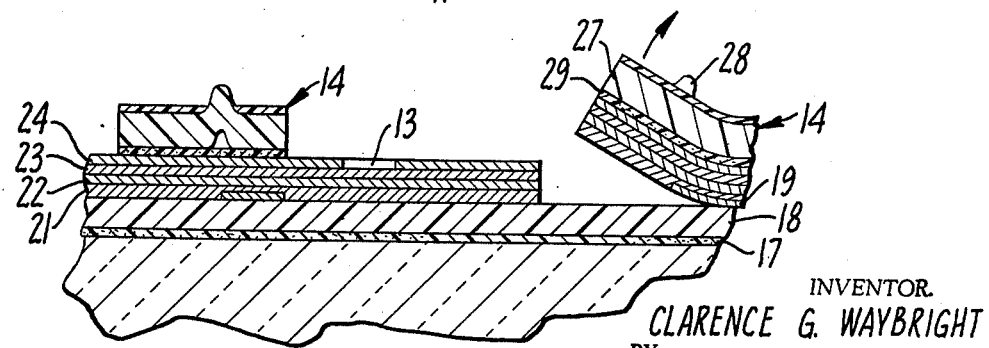
FIGURE 4 is an enlarged fragmentary cross-sectional view of the windshield sticker taken substantially on the plane of lines 4—4 of FIGURE 3, and illustrating the effect of tampering on the layers of indicia.

On the top side of the plastic 18, will be first a layer of paint which will contain the indicia in black paint as it appears in FIGURE 3. This layer is indicated by the number 19, although it will be appreciated it is not a full layer. Adjacent to the layer 19 is a layer of white paint 21 suitable as a backing for the black indicia 19. Adjacent to the layer 21, is an opaque layer of paint 22, which serves to prevent highlights of the opposed indicia from appearing on the wrong side. Above this layer of opaque paint 22, is another layer of white paint 23, which is covered by a layer of blue paint 24, but with the blue paint silk-screened on as a reverse letting the white letters show through. On top of this blue layer, is a black border 26 applied for the purposes of enhancing the appearance.

This first body of plastic and associated attachments indicated above, are provided in general by mass production, in preparation for special application of individual indicia.

Ths second body 14 consists of a tape 27 having an indicia 28 embossed therein or otherwise placed thereon, and an adhesive layer 29 for securing the tape to the main body of the sticker at the desired locations.

A typical example of the intended use of the invention will be given below as follows:

As indicated by the indicia of FIGURE 3, an autoclub could utilize the sticker for identifying members who would be entitled to certain membership privileges such as service, credit, and any other services that may be provided by the rules of the organization. When a person buys or renews his membership, the basic sticker will be provided by the organization, and the special indicia such as a member's name, serial number of his membership, and expiration date of the membership will be embossed on three separate tapes and applied as shown in FIGURE 1. The backing paper 16 is then removed from the sticker, and tthe sticker located in a lawful area of the windshield, or other window of the vehicle owned by the member.

Accordingly, with this sticker applied, the member may go to any of the service facilities provided by the organization through contract or otherwise and receive immediate service on the basis of a proper sticker. In the event that the sticker appears to be tampered with by having some of the indicia removed, the person providing the service will not provide such service without checking back to see if the purported member is entitled to such service.

If the member is entitled, the service will be provided and a new and proper sticker will be supplied. However, if the purported person is not entitled to the service, appropriate action may be taken by the person from whom service is demanded. The reason for the check would be to cover cases where tampering might have been inadvertently done by children. However, it will be appreciated that when the sticker is in proper form, it will be reasonably safe to rely on same and save the time that would be required to check the membership status of the individual each time service was needed.

While the above example of use has been illustrated for a membership sticker, it will be appreciated that other classes of stickers constructed according to the invention might be applied to vehicular windshields. Accordingly, the sticker may be used in any situation where it is desirable to provide special and general indicia, and the invention should not be limited to the specific example here shown, but only to the claims appended hereto.

From the foregoing description, it will be appreciated that a simple vehicular sticker is provided which is capable of providing general and special indicia in a substantially tamper proof way so that the sticker may be relied upon to promote rapid flow of commerce or the like.

I claim:
1. An information emblem for vehicular windows and the like, comprising
   a sheet of transparent material,
   a transparent adhesive coating on one side of said sheet for attaching said sheet to a window or the like,
   a layer of indicia on the side of said sheet opposite to said adhesive layer and visible therethrough,
   a layer of relatively opaque material mounted on said sheet on the side opposite to said transparent adhesive coating, and
   special indicia mounted on said layer on the side thereof opposite to said sheet of transparent material, and
   means for adhering said special indicia to said layer with sufficient strength to tear at least a portion of said layer away from said sheet when any attempt is made to remove said special indicia whereby such attempt will be visible through the window, said sheet of transparent material and said transparent adhesive coating.

2. An information emblem for vehicular windows and the like comprising
   a main body having a sheet of thin transparent plastic material, a plurality of layers of printed indicia formed with said main body, an opaque coating separating said printed indicia whereby one set of indicia will be visible from one side and the other set of indicia will be visible from the other side; and
   a second body of plastic material secured to said main body on the same side as said opaque coating, said second body having special indicia imprinted thereon and secured to the main body by a securing means sufficient to hold said opaque coating firmly thereto whereby any attempt to remove said second body of adhesive will disturb said opaque coating sufficient to be noticeable from the other side of said main body.

3. An information emblem for vehicular windows and the like as defined in claim 2, in which the sticker is secured to the inside of a vehicular window by a transparent pressure-sensitive adhesive coating.

4. An information emblem for vehicular windows and the like as defined in claim 2, in which the main body includes a sheet of a polyester film.

5. An information emblem for vehicular windows and the like as defined in claim 4, in which said second body is secured to said main body by means of a pressure sensitive adhesive, and said special indicia is embossed therein.

6. An information emblem for vehicular windows and the like as defined in claim 4, in which the emblem is adapted for securing to the inside of a vehicular window by means of a transparent adhesive coating.

7. The sticker for vehicular windows and the like defined in claim 6, in which said transparent adhesive coating comprises a pressure sensitive adhesive for easy removal and replacement of the sticker on the window.

References Cited

UNITED STATES PATENTS

| | | | |
|---|---|---|---|
| 194,212 | 8/1877 | Bierce. | |
| 1,955,569 | 4/1934 | Warden | 40—2.2 |
| 2,100,840 | 11/1937 | Elmore | 40—2.2 |
| 2,604,710 | 7/1952 | Beune | 40—2.2 |

EUGENE R. CAPOZIO, Primary Examiner

W. J. CONTRERAS, Assistant Examiner

U.S. Cl. X.R.

40—2